May 9, 1950     E. V. BUNTING     2,506,773
HITCH MECHANISM FOR TRACTORS
Filed June 28, 1946     3 Sheets—Sheet 1
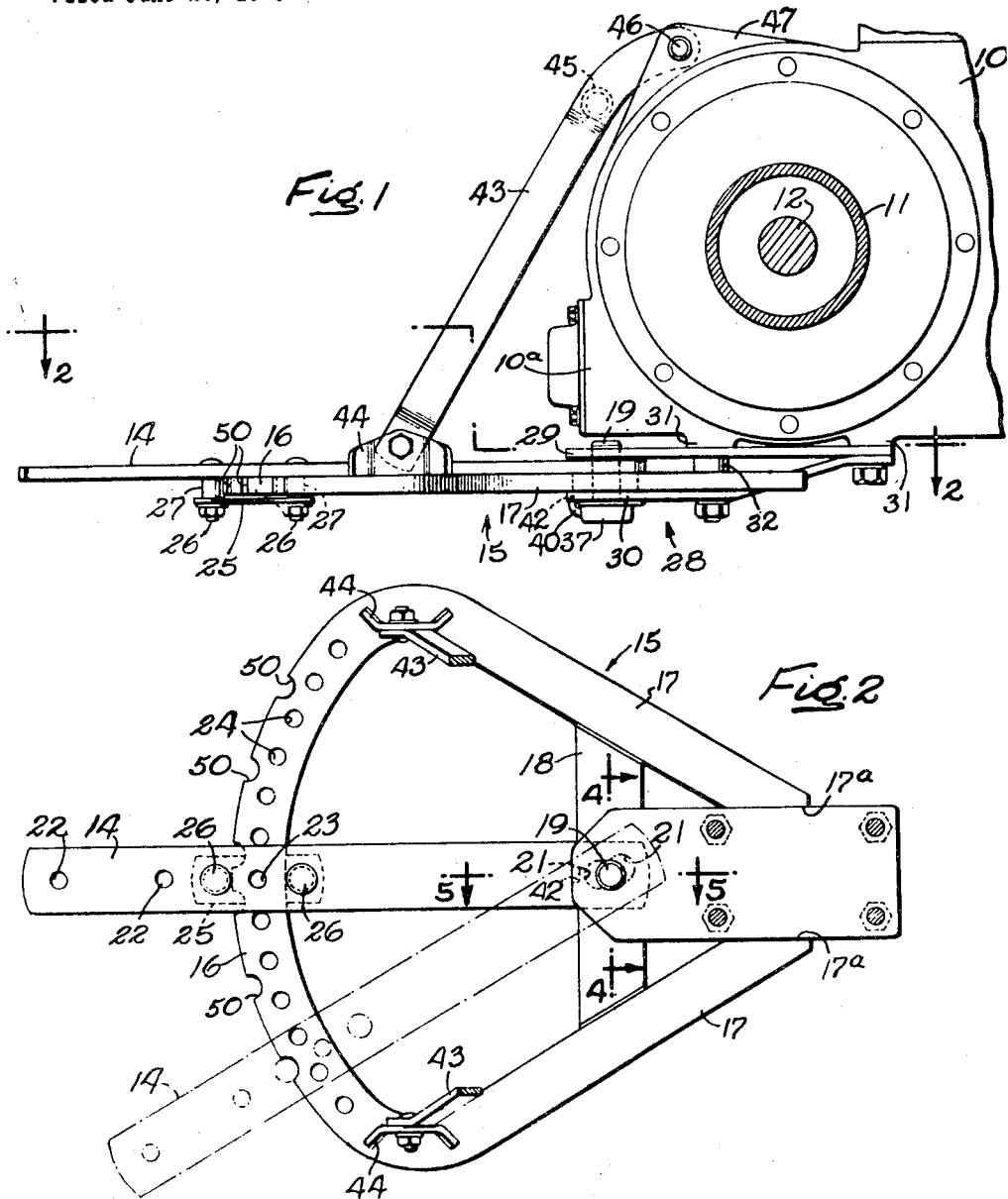
INVENTOR
Ernest V. Bunting
By Carlson, Pitzner, Hubbard & Woge
ATTORNEYS May 9, 1950     E. V. BUNTING     2,506,773
HITCH MECHANISM FOR TRACTORS
Filed June 28, 1946            3 Sheets-Sheet 2
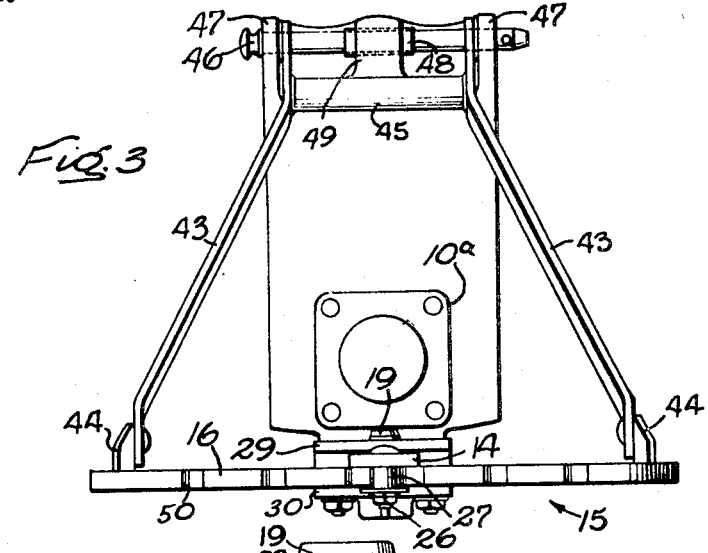
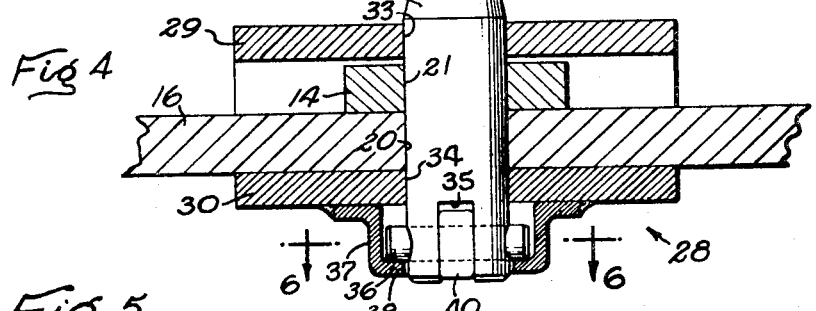
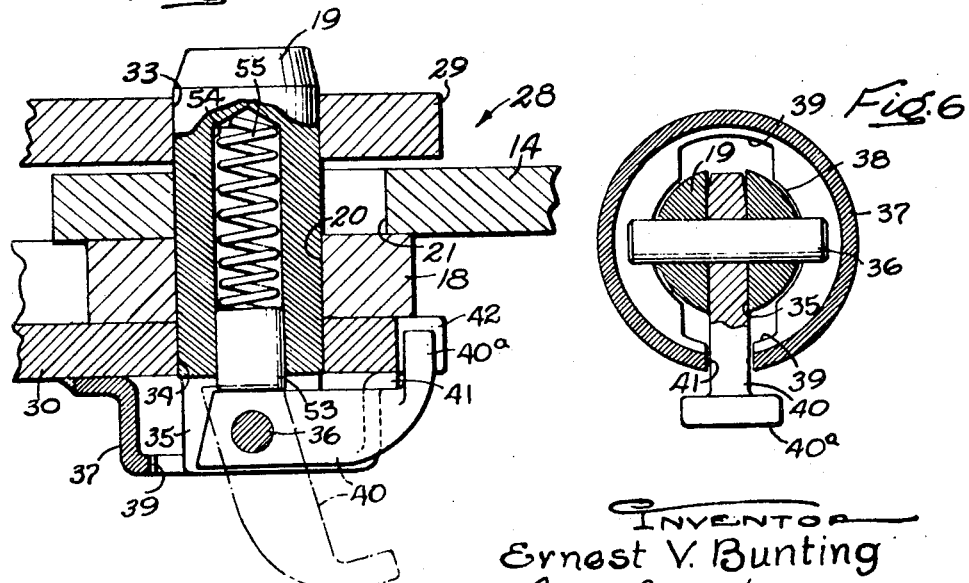
INVENTOR
Ernest V. Bunting
By Carlson, Pitzner, Hubbard & Wolfe
ATTORNEYS

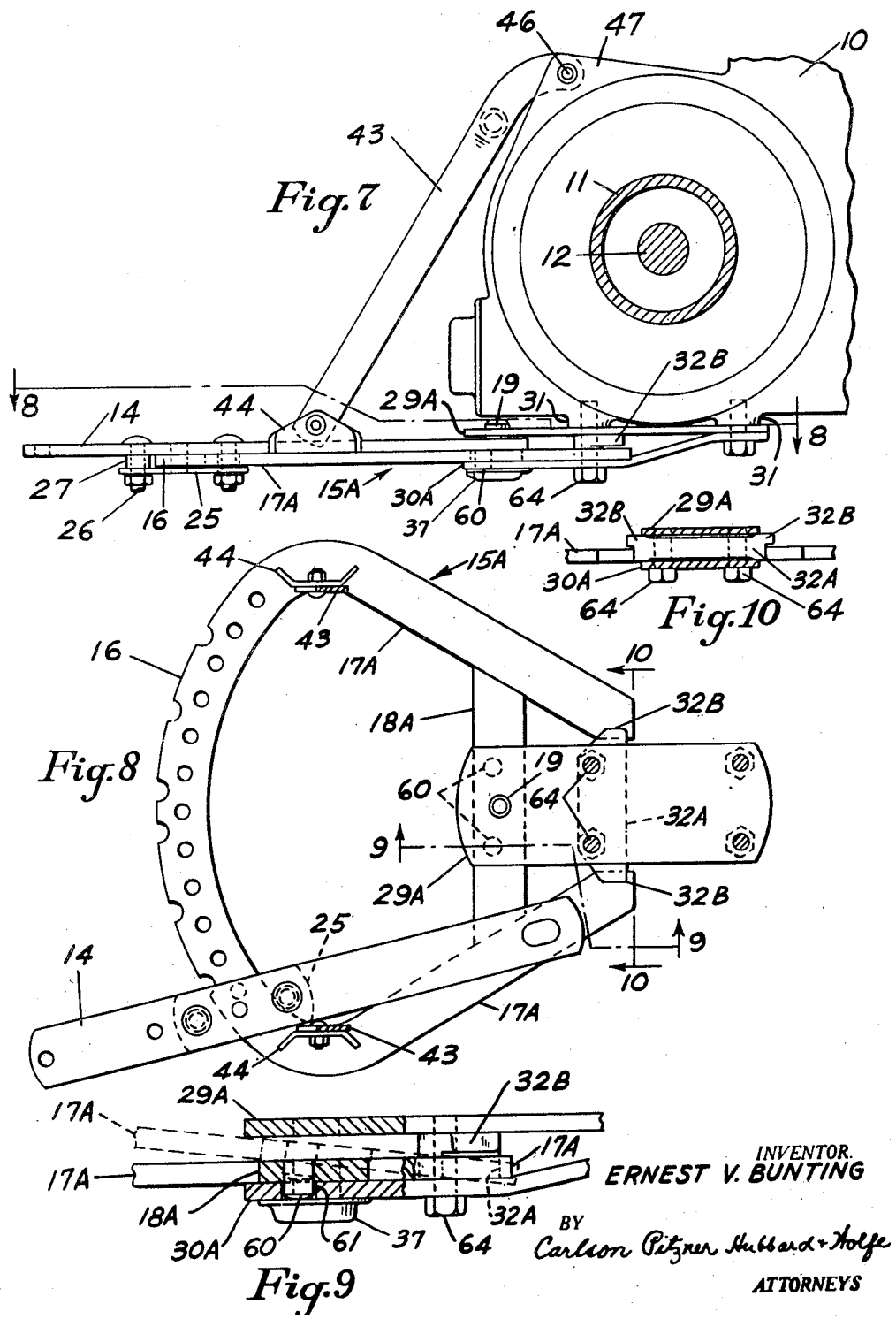

Patented May 9, 1950

2,506,773

UNITED STATES PATENT OFFICE 2,506,773

HITCH MECHANISM FOR TRACTORS

Ernest V. Bunting, Dearborn, Mich., assignor to Harry Ferguson, Inc., Detroit, Mich., a corporation of Delaware Application June 28, 1946, Serial No. 680,017

21 Claims. (Cl. 280—33.44)

The present invention pertains to hitch mechanisms for tractors, and more particularly to a swinging drawbar type of hitch.

One general object of the invention is to provide a swinging drawbar hitch for a tractor which is rugged and simple to apply, yet which affords a highly versatile connection for a variety of implements or other trailed devices.

More particularly, it is an object to provide such a hitch embodying a novel arrangement for attaching pivoting of the drawbar at a point closely underlying the rear axle of the tractor and substantially on the vertical line through the center of tractor effort but which may nevertheless be readily attached and detached.

Still another object is to provide such a hitch embodying a novel and simple arrangement for automatically locking the drawbar against lateral swing upon backing of the tractor, thereby facilitating maneuvering of the tractor and trailed device during backing.

A further object is to produce a swinging drawbar hitch having an auxiliary point of attachment above the rear axle but which precludes the possibility of accident in the event that the user fails to insert the main locking pin.

Further objects and advantages of the invention will become apparent as the following description proceeds, taken in connection with the accompanying drawings in which:

Figure 1 is a side elevation of a swinging drawbar hitch embodying the present invention, the same being shown as applied to the differential housing of a tractor.

Fig. 2 is a plan view of the hitch shown in Fig. 1 but with the associated parts cut away substantially along the line 2—2 in Fig. 1.

Fig. 3 is a rear elevation of the hitch and associated differential housing shown in Fig. 1.

Fig. 4 is an enlarged detail view taken substantially along the line 4—4 in Fig. 2 through the main pivot of the hitch.

Fig. 5 is a detail sectional view taken substantially at right angles to the section in Fig. 4, namely, along the line 5—5 in Fig. 2.

Fig. 6 is a detail transverse sectional view taken substantially along the line 6—6 in Fig. 4.

Fig. 7 is a side elevation showing a modification of the swinging drawbar hitch in which the struts must be released prior to disengaging the lower point of fastening.

Fig. 8 is a plan view of the hitch shown in Fig. 7 but with the associated parts cut away substantially along the line 8—8 of Fig. 7.

Fig. 9 is an enlarged sectional view taken on line 9—9 of Fig. 8 showing the manner in which the arcuate guide must be tilted for removal.

Fig. 10 is a detail sectional view taken on line 10—10 of Fig. 8 showing the construction of the clevis spacing block.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, a swinging drawbar type of hitch embodying the invention has been shown in Fig. 1 as applied to the rear end of a tractor, only a fragmentary portion of the latter appearing. In the particular installation shown, the tractor's differential housing 10 appears, the same being centered in a housing 11 for the rear axle 12. It is to such differential housing 10 that the hitch is detachably applied.

The hitch itself includes a drawbar 14 and a drawbar guide, designated generally as 15. The drawbar 14 may be fashioned in the form of a heavy steel bar of simple elongated flat form as shown. The drawbar guide 15, on the other hand, may be fashioned of similar stock and includes a quadrant or arcuate portion 16 with which is integral a pair of converging laterally spaced legs 17, completing a member which is generally of horseshoe shape. Spanning the gap between the legs 17 and welded or otherwise rigidly secured to the same is a transverse bar 18 located in the locus of the center of the radius of curvature of the quadrant 16.

The drawbar 14 is pivoted at its forward end for lateral swing on a pin 19 which passes through a hole 20 (see Figs. 4 and 5) in the transverse bar 18 and a registering slot 21 in the drawbar 14 which extends longitudinally of the latter. The drawbar is thus free to swing laterally about the pivot while guidingly supported by the horizontal quadrant 16.

The trailing end of the drawbar 14 protrudes well beyond the quadrant 16 and has apertures 22 in its trailing portion by means of which the tongue of an implement or other trailed device (not shown) may if desired be rigidly bolted to the drawbar. Alternatively the trailed device may be pivoted to the trailing end of the drawbar and if desired the latter locked against lateral swing, thus placing the point of articulation between the tractor and trailed device at the rear end of the drawbar rather than at its forward end. To lock the drawbar loosely or temporarily against a lateral swing for such purpose a pin (not shown) may be dropped through a hole 23 in the latter and a selected registering one of the series of holes 24 in the quadrant 16. Where a more permanent or rigid connection is wanted the use of a bolt instead of a pin permits the quadrant and drawbar to be clamped together thereby eliminating relative play. The drawbar may thus be anchored in any selected angular position to accommodate the draft requirements of a particular trailed implement or other device.

As still another alternative the hitch may be set up for articulation at both the front and rear ends of the drawbar 14. For that purpose the drawbar 14 is permitted to pivot freely about the pin 19 at its forward end, while the implement or other device being trailed is pivoted to the rear end of the drawbar rather than being rigidly attached as suggested above.

To restrain the drawbar 14 against vertical displacement with reference to the guide quadrant 16, a retaining strap 25 is provided, the same being received on a pair of bolts 26 located in the drawbar adjacent the front and rear edges of the quadrant. On these bolts 26 are spacer bushings 27 which extend through the strap 25 and seat on washers which abut the bolt heads 26. This arrangement floats the strap so that it will guide the drawbar without binding it yet permit the drawbar and quadrant to be sometimes bolted together, as aforesaid. Not only does the strap 25 retain the drawbar against vertical displacement with reference to the guide, but it also serves to aid in locating the drawbar with the slot 21 in registery with the hole 20 during insertion of the pivot pin 19. A still further and important function of the subassembly 25, 26, 27 will appear later.

The pin 19, previously identified, serves not only as a pivot for the drawbar 14, but in addition it also constitutes a part of the means for attaching the guide assembly 15 to a clevis 28 on the tractor. It is contemplated that such clevis will normally be furnished as a part of the standard equipment on the tractor although one may be applied if that is not the case. In the illustrated arrangement the clevis 28 comprises upper and lower plates 29, 30 bolted against suitable pads 31 on the underside of the differential housing 10, a spacer 32 being interposed between the offset trailing portions of the plates 29, 30 to space them apart a distance appropriate for the reception of the drawbar 14 and transverse bar 18 of the guide assembly. As shown in the drawing the spacer 32 is of the collar type.

It should be particularly noted that the forward ends of the guide side arms 17 present opposed faces 17a which are arranged to abut against the adjacent side edges of the lower plate 30 of the clevis 28. The side edges of the clevis plate 30 thus constitute locating surfaces which coact with the faces 17a to center the guide assembly 15 with reference to the longitudinal axis of the tractor. Moreover, the abutment of the faces 17a with such locating surfaces on the tractor aids in resisting lateral forces applied to the guide assembly.

The pivot pin 19 is arranged to pass through registering holes 33, 34 in the clevis plates 29, 30 to secure the drawbar and guide structure 14, 15 to the tractor. For purposes of detachment, the pin 19 should be readily removable. On the other hand, it is desirable that it be located closely beneath the tractor's rear axle 12 and substantially on the vertical line through the center of tractor effort. Such an arrangement minimizes the effect of the trailed device on steering of the tractor. As herein shown the pin is only slightly behind such vertical line so that what little effect the trailed device will have will be directed to holding the tractor on a straight forward path. The turning radius for the tractor and trailed implement or the like is also minimized by such close coupling. With the pivot pin 19 located well forward beneath the differential housing 10 as shown in Fig. 1, it is not possible, however, to utilize a pin which is simply dropped in from the top, especially when a power take-off housing 10a, such as that shown, protrudes from the lower rear portion of the differential housing. To overcome this difficulty, a special form of pin has been provided which is insertable from the bottom.

Upon reference to Figs. 4, 5 and 6 it will be seen that the pin 19 here shown has a transverse notch 35 formed in its lower end. A pin 36 is journaled in such lower portion of the pivot pin 19 to extend transversely of the notch 35 and with its ends protruding laterally. A generally cup-shaped sheet metal housing 37 is welded or otherwise rigidly secured to the lower side of the bottom clevis plate 30 and has in its bottom wall an opening 38 through which the pivot pin 19 may pass freely, as well as diametrically opposite notches 39 through which the ends of the transverse pin 36 may enter in the manner of a bayonet joint.

To install the pivot pin 19, it is inserted through the opening 38 in the housing 37 with the cross-pin 36 aligned with the notches 39 and after the cross-pin has entered into the housing, the main pivot pin 19 is rotated through a quarter turn so that engagement of the cross-pin with the housing will prevent the pivot pin from falling down.

Provision is made for locking the pivot pin against inadvertent rotation once it has been inserted, for otherwise the vibration normally incident to use might turn the pin 19 to a position in which the cross-pin 36 again registered with the notches 39. Such locking arrangement includes a locking lever or latch 40 of L-shape which is pivoted on the cross-pin 36. When swung upward from the released position shown in broken lines in Fig. 5 to the locking position shown in full lines, the locking member 40 enters a slot 41 in the side of the housing 37 and the transverse tail portion 40a of the locking member enters a corresponding notch 42 in the clevis plate 30. Hence, when the member is in locking position it is shielded on all sides against catching on some passing object and being accidentally unlocked. A spring-urged detent or plunger 53 serves to retain the locking lever releasably in either its locked or released position. Such plunger is slidable in an axial bore 54 formed in the pivot pin 19, being urged downward by a compression spring 55. The plunger 53 thus bears against either the side or end face of the locking lever 40, depending upon the position of the latter, and in either case resists movement of the locking lever to its other position. The end face of the locking lever is inclined as shown in order to prevent the operator from swinging the lever in the wrong direction.

To aid the clevis 28 in sustaining the rather heavy weight of the hitch members 14, 15 and reinforce the latter against torsional movement, a strut assembly is provided. This latter assembly includes a pair of upwardly and forwardly inclined struts 43 (Fig. 1) which converge toward each other (Fig. 3) and are pivoted at their lower ends to brackets 44 at the junctures of the arm 17 with the quadrant 16. The upper portions of these struts 43 are rigidly joined by a transverse tubular member 45, while the ends of the struts are pivoted on a transverse pin 46. Such pin is readily removable, being inserted through registering holes in a pair of lugs or ears 47 on the differential housing, as well as through a bushing 48 in a central boss 49 on such housing, and through holes in the upper ends of the struts.

Difficulty is often encountered in properly maneuvering a tractor and trailed device pivoted to it, and which can be overcome by locking the trailed device against pivoting during backing. For that purpose provision is made in the present hitch for automatically locking the drawbar 14 against lateral swing with reference to the guide quadrant 16 as an incident to backing of the tractor. It is for that purpose that a series of notches 50 are provided at appropriately spaced points in the rear edge of the quadrant and it is also for that purpose that a longitudinally extending slot 21 is provided in the drawbar to receive the pivot pin rather than simply a round hole snugly fitting the pivot pin. With the arrangement shown, when the tractor is backed, the pivot pin 19 is carried rearwardly along the slot 21 and the rear one of the spacer bushings 27 enters a corresponding notch 50, thereby locking the drawbar against lateral swing. Such a locked position for the drawbar is indicated in dot-dash lines in Fig. 2. To release such locking of the drawbar, it is only necessary to drive the tractor forward again.

From the foregoing it will be perceived that a hitch has been provided which may be easily and quickly attached to a tractor to afford a swinging drawbar for connecting on a trailed implement or the like. Moreover, it is such as to assure extreme strength and resistance to abuse as well as to lock automatically in backing to simple maneuvering of the trailed device.

*Modification including safety lock*

Ordinarily with the pivot pin 19 properly inserted the draft load is applied below the axle of the tractor and the struts 43 serve primarily to support the drawbar guide 15 and any downward force thereon. It is conceivable however, if the pin 19 is inadvertently removed, that forward movement of the tractor would cause the drawbar to be withdrawn from the clevis. In such a case, the front end of the drawbar would be disengaged from the clevis and the draft force would be transmitted to the tractor through the loose connection at 25, 26, 27 between the drawbar and guide and then through the strut members 43 to the yoke pin 46 above the rear axle. This would produce a high hitch and, under sufficient load, the front wheels of the tractor would leave the ground. To obviate this contingency, safety means are included in the modification shown in Fig. 7 through Fig. 10 which precludes the possibility that a draft force can ever be transmitted to the tractor through the members 43.

The locking arrangement forming a part of my invention makes it impossible for the drawbar guide, to become disconnected from the tractor unless the struts 43 have been previously disconnected. In other words, the drawbar guide has a conveniently detachable connection with the tractor such that, as long as the members 43 are connected, the draft force will be transmitted to the tractor through the drawbar guide and clevis whenever the drawbar and clevis are disengaged. In the present instance this is accomplished by providing auxiliary pins or lugs for detachably engaging the clevis to maintain it and the transverse bar of the drawbar guide against separation as long as the members 43 are connected.

Referring more particularly to Figs. 7 and 8 it will be seen that the general arrangement is the same as that previously described except that certain elements are slightly modified and are designated with the same numeral as before but with a letter subscript. As in the previous embodiment the drawbar guide 15A includes a flat transverse bar 18A bridging the forwardly converging legs 17A. Mounted rigidly on the transverse bar on each side of the aperture therein for the pin 19 is a short downwardly projecting pin or lug 60. In normal assembly these lugs extend into engagement with registering holes 61 in the lower clevis plate 30A. With the pins thus engaged it is impossible to pull the drawbar guide straight to the rear from between the clevis plates 29A, 30A even though the pivot pin 19, which normally assumes the draft force, may be missing.

In practicing my invention means are provided for preventing the pins 60 from coming out of engagement with the holes 61 by rotation of the guide about its pivotal connection with the struts 43. Thus, if the drawbar front end is displaced laterally, as shown in Fig. 8, the vertical play permitted the transverse bar 18A might allow the pins to clear their holes even though the struts are connected. In the present instance counterclockwise rotation of the guide is prevented by a transversely extending clevis spacer block 32A (Fig. 10) mounted between the plates of the clevis and clamped rigidly in place by the through bolts 64. Laterally projecting ears 32B extend outwardly from the ends of the clevis spacer block a sufficient distance to overlie the forward tips of the legs 17 of the drawbar guide. The ears act as abutments to prevent counterclockwise rotation of the drawbar guide and the consequent lifting of the pins 60 from the holes 61 in a lower clevis plate. Hence, a downward and rearward pull on the arcuate portion 16 of the guide cannot release the pins 60 from the holes 61. Clockwise rotation is, of course, prevented by the presence of the struts 43 since the crossbar rests on the lower clevis plate.

From the foregoing it will be evident that disengagement of the pins 60 from the holes 61 is impossible while the struts 43 remain connected. However, it is but a moment's work to intentionally effect the removal of the drawbar assembly. Thus, the operator merely removes the transverse pin 46 which passes through the pair of lugs 47 on the differential housing and then slides the drawbar 14 laterally to an out-of-the-way position as shown in Fig. 8. This provides clearance for vertical movement of the crossbar 18A between the upper and lower clevis plates so that the operator lifting on the rearward portion of the guide may tilt the assembly to about the dotted outline position illustrated in Fig. 9 to lift the pins 60 out of engagement with the holes 61. Thereupon the drawbar assembly may be completely withdrawn from its normal position within the clevis.

Reassembly is just as simple. The operator lifts the drawbar assembly and after inserting the transverse bar 18A between the clevis plates, shifts it about until the pins seat in the holes. He then connects the struts 43 with the tractor by the pin 46. Insertion of the drawbar pivot pin 19 completes the assembly. However, even if he forgets to connect the drawbar with the tractor by the pivot pin 19 no harm can result since the draft load will, as above pointed out, always be transmitted through the clevis plate.

This application is a continuation in part of applicant's prior application Serial No. 622,125, filed October 13, 1945.

I claim as my invention:

1. In a hitch mechanism for a tractor, the combination of an elongated drawbar adapted to extend generally longitudinally of the line of draft, pivot means at the forward end of said drawbar supporting the same for lateral swing with reference to the rear end of the tractor and for limited endwise movement with reference thereto, guide means adapted for rigid attachment to the tractor and including a horizontally disposed guide quadrant in the form of a curved bar for supporting the trailing portion of said drawbar while leaving it free to swing laterally, a retaining strap having spacer means at each of its ends for fore and aft fastening of said strap to said drawbar and defining a closed slot adjacent thereto, said quadrant being slidably received in said slot to maintain said quadrant and said drawbar together as a unit, said quadrant having a plurality of notches spaced along its rear edge, each of said notches being so formed as to enable reception of the adjacent spacer means upon backward thrust of said quadrant against said drawbar within the range of limited endwise movement of the latter thereby to lock said drawbar against lateral swing.

2. In a hitch mechanism for a tractor presenting a pair of laterally outward facing locating surfaces on its rear end portion and having a draft connection, the combination of a generally horseshoe shaped guide including a transverse portion with a pair of laterally spaced legs projecting therefrom in side-by-side relation, a drawbar extending generally longitudinally of said guide and slidably supported on said transverse portion with the trailing end of said drawbar protruding rearward beyond the same, means for detachably securing said guide and drawbar to the draft connection on the rear end portion of the tractor in generally horizontal position with said legs of said guide extending forwardly of said securing means and with said drawbar pivoted to swing laterally, and said legs presenting opposed surfaces adapted to abut solidly against said locating surfaces on the tractor.

3. In a hitch mechanism for a tractor presenting a pair of laterally outward facing locating surfaces on its rear end portion, the combination of an elongated drawbar, means including a support arranged to guidingly sustain said drawbar with the latter protruding rearwardly from the tractor and free to swing laterally, and means for detachably securing said support and drawbar to the rear portion of the tractor in trailing relation thereto, said support presenting a pair of opposed surfaces extending forwardly of said securing means and adapted to abut solidly against said locating surfaces on the tractor, said abutting surfaces being so constructed that said securing means assumes the tension component of the draft load.

4. In a hitch mechanism for a tractor having a pair of laterally directed locating surfaces on the respective opposite sides of its rear end portion and also having a draft connection rearwardly of said surfaces, the combination of a horizontally arranged drawbar support, said support being integrally constructed of a strip of steel formed in horeshoe shape with the forwardly projecting legs thereof arranged for positioning adjacent said respective locating surfaces, said legs having opposed surfaces for intimate fore and aft sliding engagement with said locating surfaces, a transverse bar spanning the legs of said support and rigidly connected thereto, a drawbar extending rearwardly from said transverse bar and adapted to be pivoted thereon for lateral swing, and means for disengageably joining the draft connection on said tractor to said transverse bar on said drawbar support to resist all of the draft component tending to slidably disengage the opposed surfaces on said support from the locating surfaces on the tractor.

5. In a hitch mechanism for a tractor having a plurality of locating surfaces on its rear end portion, the combination of a drawbar and a support therefor, means for attaching said support and drawbar to the rear end portion of the tractor with the drawbar pivoted to swing laterally with reference to the support and tractor, means including abutting surfaces on said support arranged to abut against said locating surfaces for restraining said support against lateral movement with respect to said tractor, said support being of rigid unitary construction in a horizontal plane with said abutting surfaces solidly fixed thereon for resisting any torsional stress applied to said support about said attracting means.

6. In a hitch mechanism for a tractor having a differential housing on its rear end portion beneath which is fixed a clevis, the combination of a horizontal guide having a pair of forwardly projecting laterally spaced legs, a drawbar, means including a pin for pivoting the forward end of said drawbar to said clevis with said drawbar trailing rearward in crossing relation to said guide, and said legs presenting opposed surfaces adapted to abut solidly against the corresponding opposite sides of said clevis.

7. In a hitch mechanism for a tractor having a clevis on its rear end portion, the combination of a generally horseshoe shaped guide having a transverse bar rigidly joining the legs of the guide adjacent their outer ends, a drawbar arranged to extend generally longitudinally of the U in crossing relation with the latter's base portion, means including a pivot pin passing through registering apertures in the forward end of said drawbar and said transverse bar for connecting the same to said clevis, and means for suspendingly supporting said horseshoe shaped guide in generally horizontal position from the rear end of the tractor.

8. In a hitch mechanism for a tractor, the combination of a generally horseshoe shaped guide including a transverse portion and a pair of laterally spaced legs projecting forwardly therefrom, a drawbar extending generally longitudinally of said guide in crossing relation with said transverse portion and with the trailing end of said drawbar protruding rearward beyond the same, said guide also having a second transverse portion joining said legs adjacent their forward ends, and means including a single pivot pin arranged to pass through both said second transverse portion of said guide and through the forward end of said drawbar for detachably connecting said drawbar and guide to the rear end portion of a tractor with the guide lying substantially in a horizontal plane and its legs extending forwardly toward the tractor.

9. In a hitch mechanism for a tractor, the combination of a generally horseshoe shaped guide including an arcuate portion and a pair of laterally spaced legs, a drawbar extending generally longitudinally of said guide and slidably supported on said arcuate portion with the trailing end of said drawbar protruding rearward beyond the same, means including a pair of upwardly extending struts pivoted to said guide for suspendingly supporting the same from the rear end portion of the tractor in horizontal position with said legs of said guide extending forwardly, said guide also having a transverse portion joining said arms in the locus of the center of the radius of curvature of said arcuate portion, and means including a single pivot pin arranged to pass through both said transverse portion of said guide and through the forward end of said drawbar for detachably connecting the same to the rear end portion of the tractor at a point below the point of attachment of said struts.

10. In a hitch mechanism for a tractor having a differential housing on its rear end portion, the combination of a clevis, means for securing said clevis beneath said differential housing, said clevis including upper and lower members with registering holes therein, the lower clevis member having a housing on its under side with a hole in it registering with the first mentioned holes, a drawbar pivot pin insertable upwardly through said holes, diametrically opposed lateral projections on said pin, said housing having a pair of slots for passage of said projections into said housing, means for locking said pin in a turned position in said housing with said projections out of registry with said slots, and a drawbar trailingly pivoted on said pin for lateral swing.

11. In a hitch mechanism for a tractor having a differential housing on its rear end portion, the combination of a clevis including upper and lower members having registering holes therein, means for attaching said clevis beneath said differential housing a drawbar pivot pin insertable upwardly from beneath through said holes, and coacting means on said pin and lower clevis member for releasably locking said pin in position.

12. In a hitch mechanism for a tractor, the combination of a pivot pin, a pin-support adapted to be secured beneath the rear end portion of the tractor and having an aperture therein through which said pin is insertable from below, means on the lower end of said pin for releasably locking it in position within said aperture, and a shield embracing said locking means when said pin is in said aperture for preventing inadvertent release of said pin.

13. In a hitch mechanism for a tractor, the combination of a clevis adapted to be attached beneath the rear end of the tractor and including upper and lower members with registering holes therein, a vertical pivot pin passing through said holes, a transverse pin in the lower end of said pivot pin having ends projecting laterally therefrom, a cup-shaped housing fixed to the underside of the lower clevis member in position to enclose said transverse pin, an operating lever pivoted on said transverse pin and projecting outward from said pivot pin, said housing having a central opening with a pair of diametrically opposite notches leading therefrom for passage of said pivot pin with its transverse pin, said housing also having a slot therein to receive said lever when the latter is swung upward with said pivot pin turned so that said transverse pin is out of registry with said notches, said pivot pin having a longitudinal bore therein, and means including a spring-urged plunger slidable within said bore for locking said lever alternatively either in its locking position in said slot or in a released position in which it projects downward free of said slot.

14. In a hitch mechanism for a tractor having a main hitching point and having a strut connection located respectively below and above the rear axle thereof, the combination comprising a drawbar assembly adapted to extend rearwardly from said main hitching point for assuming the draft load, an auxiliary strut member extending forwardly and upwardly from said drawbar assembly for engagement with said strut connection, means including a pair of mating abutment members rigid respectively with said drawbar assembly and tractor for preventing rearward withdrawal when said abutments are engaged, and means coacting with said strut for restraining said drawbar assembly against movement into a position of disengagement for said abutments except when said strut is freed of said strut connection.

15. In a hitch mechanism for a tractor having a main hitching point and having a strut connection above the rear axle thereof, the combination comprising a drawbar, a drawbar guide connected to said drawbar and supporting the same for horizontal pivoting movement, means including a pivot pin mountable on said main hitching point for connecting said drawbar and guide to the tractor, means including a lug and a registering abutment for preventing rearward withdrawal of said drawbar guide in the absence of said pin without first moving said drawbar guide from its normal plane, and a strut member detachably interconnecting said drawbar guide and said strut connection for preventing movement of said drawbar guide from its normal plane as long as said strut member is connected.

16. In a swinging drawbar assembly for a tractor having upper and lower connection means therein located respectively above and below the horizontal plane of the tractor rear axle, the combination of a drawbar, a drawbar guide, means for detachably connecting said drawbar pivotally and said drawbar guide fixedly to the lower connection means, means for connecting said drawbar guide with the upper connection means, and secondary means for connecting said drawbar guide to the lower connection means, said secondary means being arranged and dimensioned for assembly to or disassembly from the lower connection means only when said drawbar guide is disconnected from the upper connection means.

17. In a hitch means for connecting a tractor and a trail-behind implement or the like, which tractor is characterized by embodying upper and lower attachment means at the rear thereof located respectively above and below the tractor rear axle, the combination of a draft member arranged for pivotal and detachable connection at its forward end with said lower attachment means, a frame supportingly connected with said draft member and having means for suspending said frame detachably from said upper attachment means, and means independent of said draft member for detachably connecting said supporting frame with said lower attachment means.

18. In a hitch mechanism for a tractor having a differential housing on its rear end portion, the combination of a clevis including upper and lower members having registering holes therein, means for attaching said clevis beneath said differential housing, a drawbar pivot pin insertable upwardly from beneath through said holes, and coacting means on said pin and adjacent the holes in said clevis member for releasably maintaining said pin in inserted position.

19. In a hitch mechanism for a tractor having a differential housing on its rear end portion, the combination comprising a clevis including an upper clevis plate and a lower clevis plate having registering holes formed therein, means for attaching said clevis plates with the trailing ends in spaced relation on the underside of said differential housing so that the pivot point located by said registering holes lies generally under said housing, a pivot pin insertable in said holes upwardly from beneath them, keeper means on said pin for keeping the pin in its upwardly inserted position until intentional removal thereof, said clevis having a retaining shoulder thereon for cooperating with said keeper means.

20. A clevis assembly for attachment beneath the rear axle housing of a tractor comprising, in combination, a flat upper plate having an end portion arranged to project rearwardly, an underlying second plate having its forward end portion arranged in face-to-face contact with the corresponding portion of the underside of the first mentioned plate, the rear portion of said second plate being offset downwardly in spaced parallel relation with the overlying corresponding portion of the first mentioned plate, a spacer collar arranged between the forward part of the offset portions of said plates, through-fasteners passing through said plates for securing the same to suitable mounting pads or the like, one of said through-fasteners passing through said spacer collar, and the trailing portions of said plates having registering apertures therein for reception of a connecting pin or the like.

21. In a hitch mechanism for a tractor having a clevis mounted below the differential housing thereof and having a point of pivotal connection at its trailing portion, the combination of a horizontally arranged drawbar support, said support being of generally horseshoe shape including an arcuate portion and a pair of forwardly extending legs, a transverse bar spanning the intermediate portions of the legs of said support and rigidly connected thereto, means including a pivot pin for not only connecting said transverse bar to the clevis but also for providing a point of connection for a rearwardly extending drawbar, and a support-engaging member having a pair of laterally directed locating surfaces together with laterally projecting abutments, said member being adapted for mounting within the clevis at the forward portion thereof, the locating surfaces of said member being separated sufficiently to fit snugly within the respective legs of said horseshoe support and thus prevent horizontal rotation of the latter, and said laterally projecting abutments being arranged above said locating surfaces to engage said legs and to limit upward swinging movement thereof relative to the differential housing of the tractor.

ERNEST V. BUNTING.

REFERENCES CITED

The following references are of record in the file of this patent:

UNITED STATES PATENTS

| Number | Name | Date |
|---|---|---|
| 1,627,998 | Porter | May 10, 1927 |
| 1,715,682 | Starks | June 4, 1929 |
| 1,830,874 | Hendrickson | Nov. 10, 1931 |
| 2,232,407 | Riesterer | Feb. 18, 1941 |